ably the main portion thereof with
UNITED STATES PATENT OFFICE.

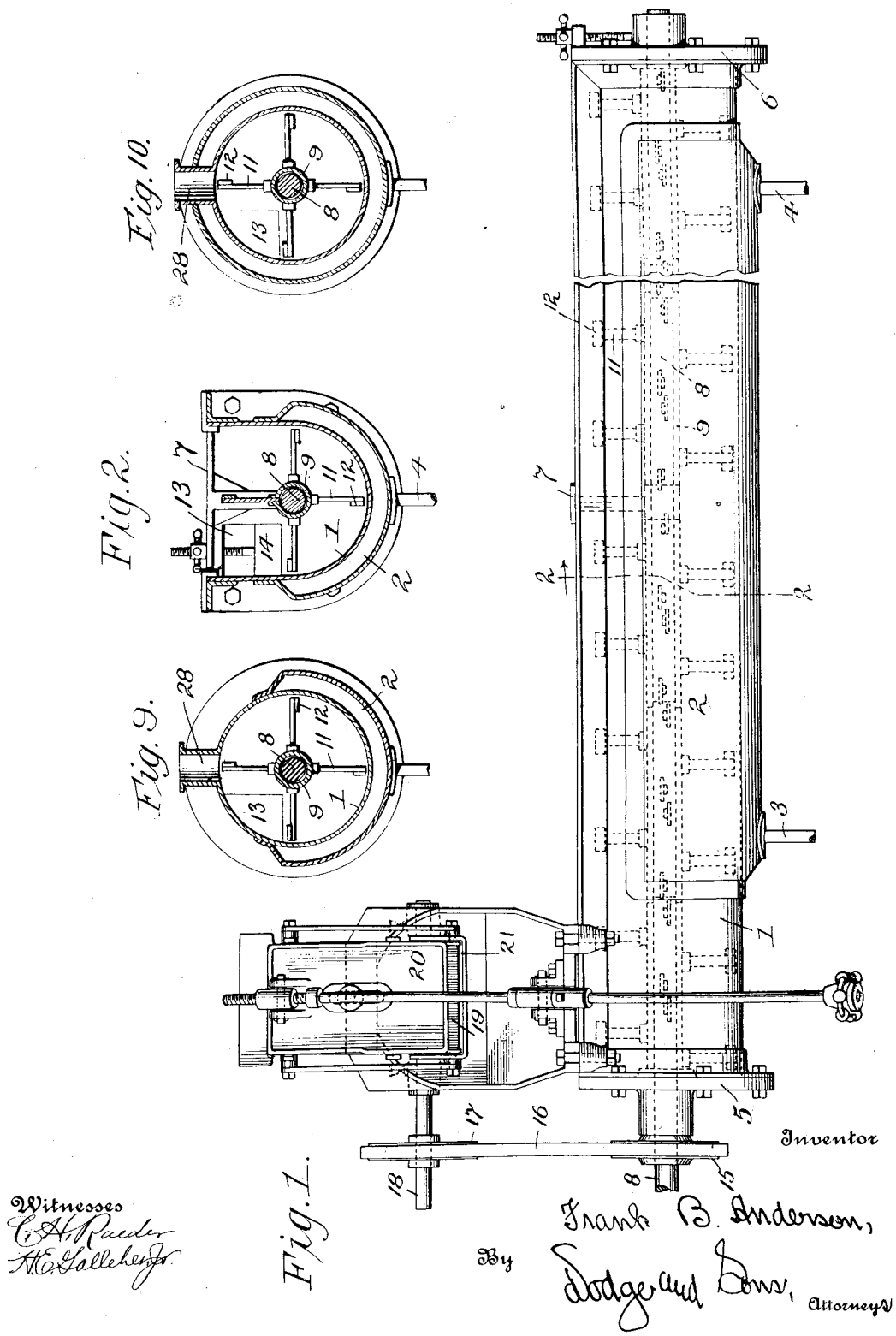

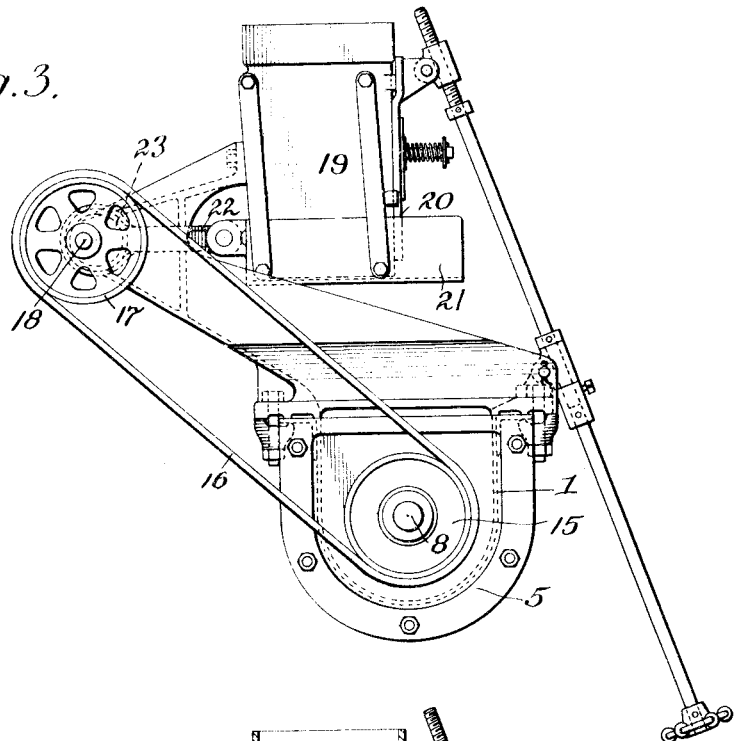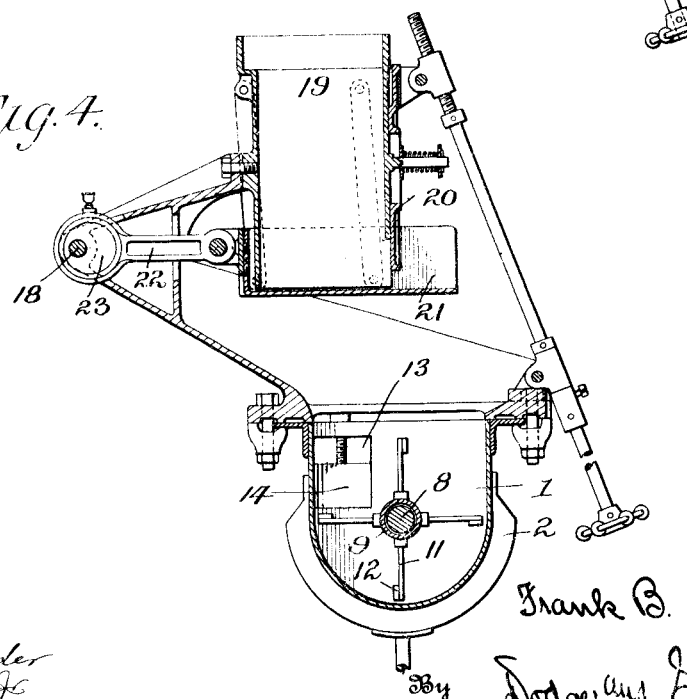

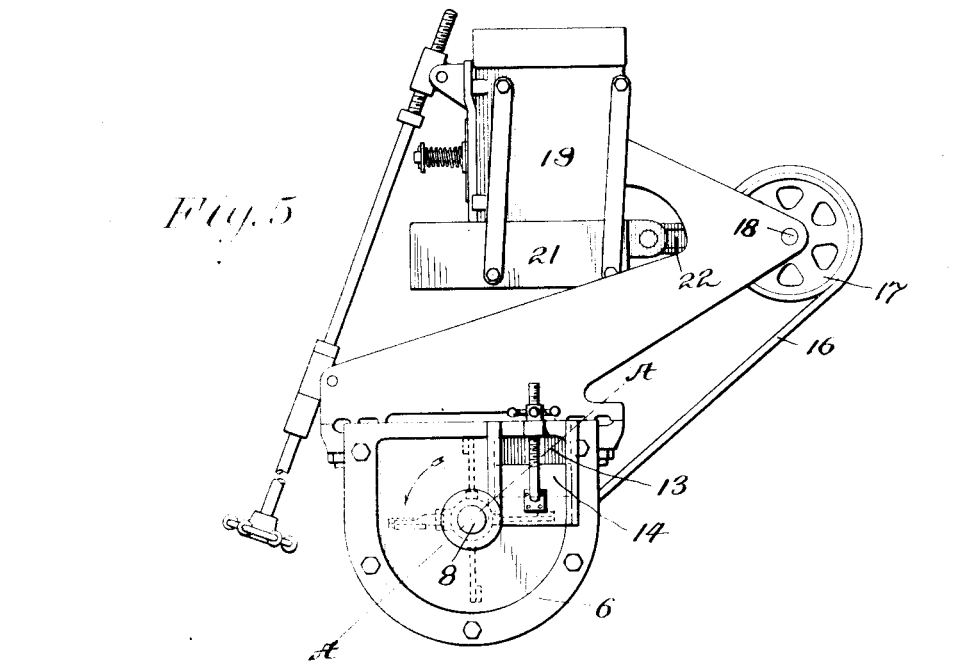
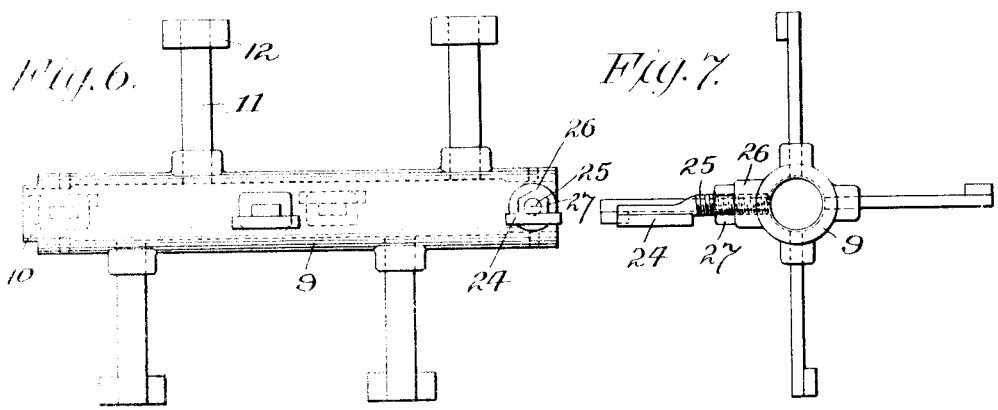
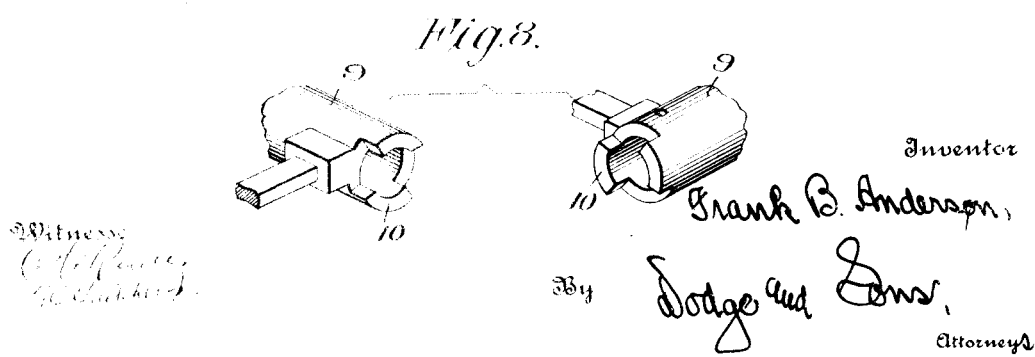

FRANK B. ANDERSON, OF CLEVELAND, OHIO.

DRIER, TEMPERING-HEATER, AND COOKER.

1,132,421.  Specification of Letters Patent. Patented Mar. 16, 1915.

Application filed July 8, 1914. Serial No. 849,822.

*To all whom it may concern:*

Be it known that I, FRANK B. ANDERSON, a citizen of the United States, residing at Cleveland, in the county of Cuyahoga and State of Ohio, have invented certain new and useful Improvements in Driers, Tempering-Heaters, and Cookers, of which the following is a specification.

My present invention pertains to an improved drier, tempering heater and cooker, adapted to handle material such, for instance, as corn, cottonseed, cottonseed meats, brewers' grain and the like.

The apparatus is especially adapted for use with material which is to be subjected to heat for a considerable period of time, and in its simplest form is shown in the annexed drawings, wherein:

Figure 1 is a side elevation thereof; Fig. 2 a transverse vertical sectional view, taken on the line 2—2 of Fig. 1, looking in the direction of the discharge end of the machine; Fig. 3 a front end elevation of the machine; Fig. 4 a transverse vertical sectional view of the machine through the feed end thereof, showing the mechanism for periodically feeding the material to the trough below; Fig. 5 an end view of the machine or apparatus, looking toward the discharge end thereof; Fig. 6 a side elevation of one of the quills with the stirrer blades or paddles thereon; Fig. 7 an end view thereof, showing the paddle which works adjacent the opening in the discharge end of the machine; Fig. 8 a perspective view of the adjacent ends of two quill members showing the manner of connecting the same; Figs. 9 and 10 sectional views, showing modifications of the invention.

The main object of the invention is to provide an apparatus wherein the wet material will be subjected to a relatively long period of drying or cooking, and caused to pass gradually from the intake to the discharge end of the machine, the feed and the discharge being continuous after the apparatus is once loaded. The construction is such that the wet material is intermingled with the material already in the trough, which latter material has absorbed, to a greater or less extent, the heat radiated from the inner surface of the heated trough, whereby such wet material is subjected at the outset to a certain degree of heat. It has been found that, for a given amount of heating surface, better results are attained by agitating the material in the heated trough and intermixing the wet material gradually therewith, than could be secured where the material is merely fed over a heated surface and then discharged.

Referring to the drawings, Figs. 1 to 8 inclusive, 1 denotes a trough substantially U-shaped in cross-section and provided throughout the main portion thereof with a jacket 2, spaced away therefrom, said jacket being provided with inlet and outlet pipes 3 and 4 for the introduction of a heating material to the space formed between the jacket and the body of the trough, and its outflow therefrom. The forward end of the trough is closed by a head 5, and the discharge end by a head 6, said heads, together with a bracket 7 (Figs. 1 and 2) forming the support for a shaft 8. A series of quills 9 are pinned or otherwise secured to said shaft so as to rotate therewith. Four of such quills are shown in the drawings, and the adjacent ends of the quills, at each side of the bracket 7, are provided with interlocking lugs 10, so as to cause the quill sections to become in effect one, and relieve the pins from undue strain. Each of said quills carries a plurality of paddles or agitators, formed upon arms 11, each arm being provided at its outer end with a cross member or paddle 12. Said paddles, as will be noted upon reference to Fig. 6, are spaced about the quill in a staggered relation, that is to say, no two paddles are in the same line transversely of the quill, and as a consequence, in passing through the material in the trough each paddle has its own path of movement, which, however, is distinct from that of the paddle upon each side thereof.

The head 6 will preferably be provided with an opening 13, through which the material is discharged. Said opening may be placed at any height, dependent upon the material to be treated, and the length of time it is desired to keep the same under treatment. Or an adjustable gate 14 (Fig. 5) may be employed so as to control the height to which the material must rise in the apparatus before it can be discharged.

The shaft 8 is driven in any suitable manner and carries a pulley or sprocket-wheel 15, about which passes a belt or sprocket-chain 16, which in turn passes about a pulley or sprocket-wheel 17, mounted upon a shaft 18.

Any suitable means may be employed for feeding the material into the forward or head end of the trough, and in the present case the ordinary type of feeding mechanism is shown. It comprises a hopper 19, having a vertically adjustable gate 20, beneath which hopper and gate there is mounted a reciprocating trough-shaped bottom 21, actuated through a pitman 22, which is moved by an eccentric 23, mounted upon the shaft 18.

Upon reference to Figs. 6 and 7, it will be noted that the paddle at the right-hand end of the quill and designated by reference numeral 24, is adjustable; that is to say, its stem 25 is threaded into a boss 26, formed upon the quill and it may be held in its adjusted position by a lock-nut 27. This may be termed the discharge paddle, and through the arrangement just described the face thereof may be inclined either toward or away from the discharge opening, for increasing or retarding the rate of discharge of the dry material.

The operation of the apparatus thus far described is as follows: The interior surface of the drier being heated and the shaft 8 set in motion, the material to be dried or cooked is fed into the feed end uniformly and continuously by means of the feeder or its equivalent, and through the action of the paddles it is distributed evenly throughout the entire length of the drier. As the feeding continues, the trough gradually fills, until the load of stock reaches a point high enough to overflow through the discharge opening 13, or over the upper edge of the gate 14. When the drier becomes filled, the discharge is continuous, and in proportion to the amount fed in by the feeder. The load which has thus been accumulated and maintained at all times in the drier, absorbs or stores up the heat radiated from the inner surface thereof. The continuous discharge of the wet material from the feeder into this body of hot material, causes the apparatus to dry it much more rapidly for the same amount of heating surface than would be the case if the material were fed in and allowed to pass along the bottom only of the drier, and out through an opening located in line with the bottom at the opposite end, as is now the customary practice. The cause of the extra drying capacity of this construction is the length of time the material remains subjected to heat when passing through the drier. For example, if the drier carries a load of 1,000 pounds before it commences to discharge, and the feeder is set to feed 1,000 pounds per hour, that amount of material will have to be fed in before the machine begins to discharge at all, and as a consequence the material in the drier will be subjected to heat therein for one hour before any of it passes from the machine. In other words, the feeding movement of the material through the machine and the discharge thereof through the opening 13 is a continuous one, and the agitation of the material merely causes it to assume its own level and to gradually feed toward the discharge end of the machine. The paddles do not feed the material, but merely cause it to assume its own level. The steam which is driven off passes from the upper open portion of the trough.

The machine will be found to be especially applicable for cooking cottonseed meats, preparatory to placing them in a hydraulic press. The heat, of course, can be regulated as desired and the mass will be evenly and thoroughly cooked throughout, owing to the agitation of the same as it passes from the feed to the discharge end of the apparatus.

It is conceivable, of course, that the trough might be entirely inclosed, as shown in Fig. 9, with the lower portion thereof alone jacketed, or the entire trough jacketed, as illustrated in Fig. 10. Under either of these constructions it would be necessary to provide a vent or off-take, as at 28, for the steam which is driven out of the material under treatment.

It will be noted that in the operation of this machine the upper surface of the material does not assume a horizontal position, but on the other hand, the exposed surface lies in a plane or at an angle, indicated by the dotted lines A—A in Fig. 5.

Having thus described my invention, what I claim is:

1. In an apparatus of the character described, the combination of a trough-shaped member having a discharge opening located in the upper portion of one end thereof; means for continuously feeding material into the opposite end of the trough; means for heating said trough; and a series of agitators mounted in said trough and adapted to agitate the material fed thereto and to cause the same to assume a substantially even level throughout the trough, whereby the material will be gradually fed from the feed end to and through the discharge opening.

2. In an apparatus of the character described, the combination of a trough-shaped member; means for constantly feeding material to one end thereof; an off-take located at the opposite end of the trough-shaped member and adapted to maintain a load of material therein; and a series of agitators mounted in said trough-shaped member and adapted to act upon the material, whereby the material will maintain a given level therein and gradually feed from the feed end to the offtake.

3. In an apparatus of the character described, the combination of a trough-shaped member provided with a discharge opening at one end; means for feeding material to said trough-shaped member at the opposite end thereof; a series of agitators mounted in said trough-shaped member and adapted to act on the material as it passes therethrough; and a discharge paddle located adjacent the discharge opening, said paddle being adjustable, whereby the rate of discharge may be increased or diminished according to the adjustment of said paddle.

4. In an apparatus of the character described, the combination of a trough-shaped member provided with a discharge opening at one end thereof, said opening being elevated above the bottom or lower portion of the trough; means for feeding material to be treated into the opposite end of the trough at a substantially constant rate; and means for agitating the material throughout the length of the trough, whereby the material will be caused to seek a level, or common plane of rest, and will gradually pass from the feed to the discharge end of the trough and finally out through the discharge opening.

5. In an apparatus of the character described, the combination of a horizontally-disposed trough-shaped member; means for feeding material thereto at one end; means for stirring said material throughout the length of the trough and thereby causing an intermingling of the material and likewise causing it to assume a level throughout the trough; and a regulable discharge opening at that end of the trough opposite the feed end.

6. In an apparatus of the character described, the combination of a horizontally-disposed trough-shaped member; means for heating the same; means for continuously feeding material to one end thereof; a regulable discharge opening at the opposite end; and a plurality of agitators for the material, extending throughout the length of the trough, said agitators causing an intermingling of the material and likewise causing it to assume a common level throughout the trough, whereby the material will gradually feed from the feed end to the discharge opening.

7. In an apparatus of the character described, the combination of a trough-shaped member; means for heating the same; means for feeding material to one end of the trough, said trough having an elevated discharge opening at its opposite end; a series of agitators working in said trough throughout its length; and an adjustable agitator located adjacent said discharge opening.

8. In an apparatus of the character described, the combination of a trough-shaped member; means for heating the same; an adjustable discharge gate located at one end of said trough; means for feeding material into the opposite end of the trough; a series of agitators working within the trough throughout its length; and an adjustable agitator working adjacent the discharge gate.

9. In an apparatus of the character described, the combination of a heated receptacle adapted to receive the material to be dried; means for feeding the material to one end of the receptacle; and means for agitating the material within the receptacle, said means serving to bring the material to a common level throughout the length of the receptacle and to thereafter cause it to be discharged therefrom at a speed equal, or substantially equal, to the rate of feed.

10. In an apparatus of the character described, the combination of a heated trough-shaped receptacle provided with an elevated discharge opening at one end; means for feeding the material to be dried to the opposite end of the receptacle; and a series of agitators working in the receptacle throughout the length thereof, that agitator which works adjacent to the discharge opening being adjustable as to height and angularity, substantially as described.

11. In an apparatus of the character described, the combination of a trough-shaped member; means for heating the same; a discharge gate located at one end of said trough; means for feeding material into the opposite end of the trough; and a series of agitators working within the trough throughout its length and serving to keep the material at a common level.

12. In an apparatus of the character described, the combination of a horizontally-disposed trough-shaped member, said member being provided at one end with an elevated discharge opening, and at its opposite end with an elevated feed opening; and agitating means located within the trough-shaped member and movable transversely to the longitudinal axis thereof, whereby the material will be constantly agitated, its level maintained, and discharged from the trough-shaped member at the same rate as that of the feed.

13. In an apparatus of the character described, the combination of a horizontally-disposed trough-shaped member, said member being provided at one end with an elevated discharge opening, and at its opposite end with an elevated feed opening; means for heating the trough-shaped member; and a plurality of agitators located within the trough-shaped member and movable transversely to the longitudinal axis thereof, whereby the material will be constantly agitated, its level maintained, and discharged from the trough-shaped member at the same rate as that of the feed.

In testimony whereof I have signed my name to this specification in the presence of two subscribing witnesses.

FRANK B. ANDERSON.

Witnesses:
CHAS. J. FONTANA,
M. E. HARRINGTON.